FAST-RESET INTEGRATOR CIRCUIT
Filed March 30, 1967 2 Sheets-Sheet 1
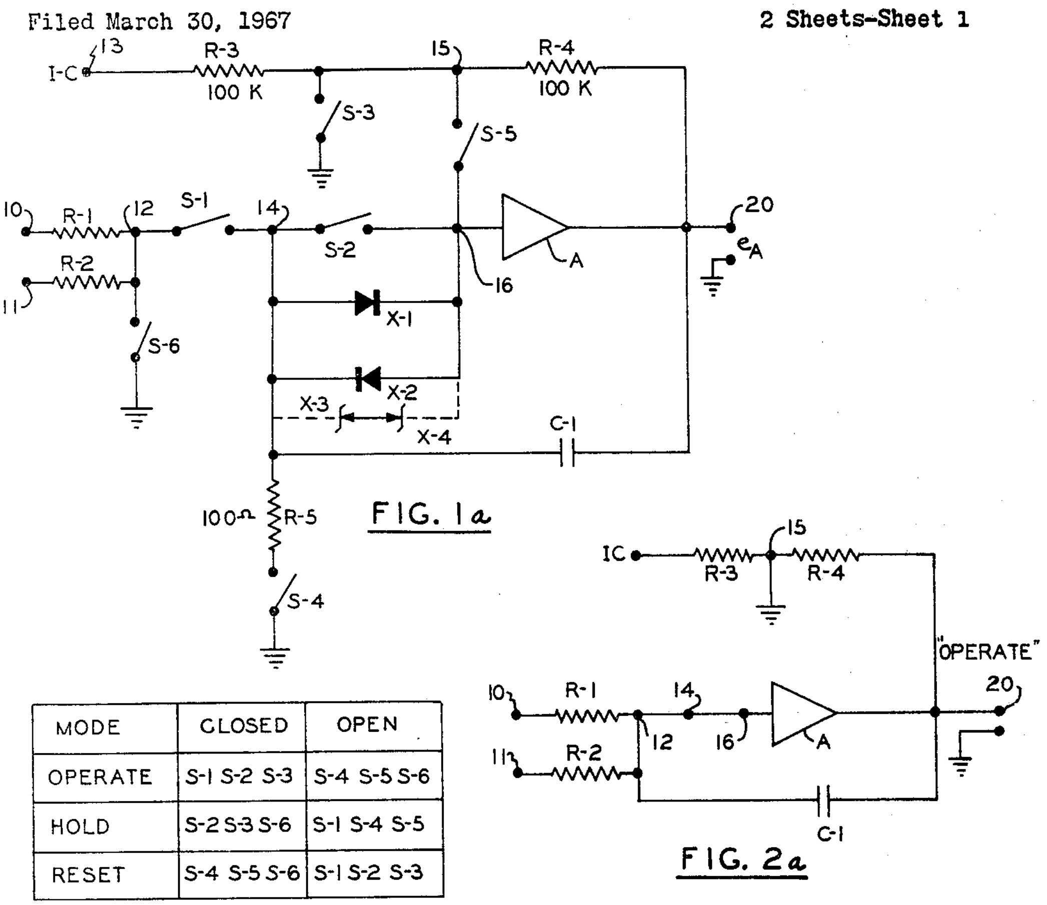
FIG. 1a FIG. 2a
| MODE | CLOSED | OPEN |
|---|---|---|
| OPERATE | S-1 S-2 S-3 | S-4 S-5 S-6 |
| HOLD | S-2 S-3 S-6 | S-1 S-4 S-5 |
| RESET | S-4 S-5 S-6 | S-1 S-2 S-3 |
FIG. 1b
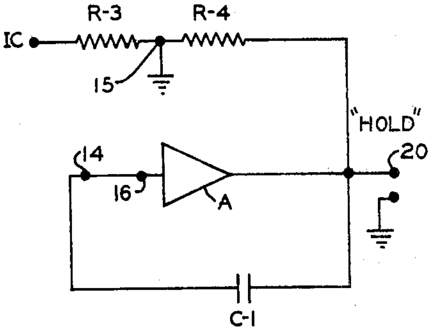
FIG. 2b
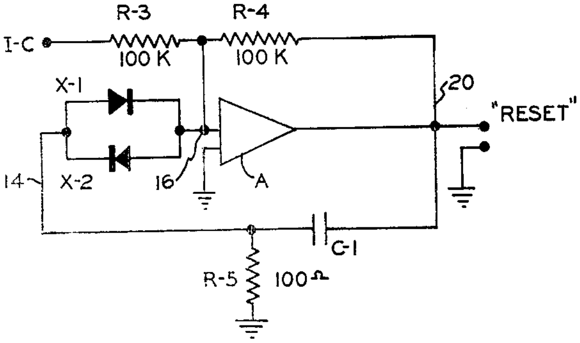
FIG. 2c
*INVENTOR.*
EDWARD O. GILBERT
ELMER G. GILBERT
*BY* Richard D. Stephens
ATTORNEY INVENTOR.
EDWARD O. GILBERT
ELMER G. GILBERT
BY Richard D. Stephens
ATTORNEY 3,503,049

FAST-RESET INTEGRATOR CIRCUIT

Edward O. Gilbert and Elmer G. Gilbert, Ann Arbor, Mich., assignors to Applied Dynamics, Inc., Ann Arbor, Mich., a corporation of Michigan Filed Mar. 30, 1967, Ser. No. 627,181
Int. Cl. G11b *1/00*
U.S. Cl. 340—173 20 Claims

ABSTRACT OF THE DISCLOSURE

A mode-switchable integrator or track-hold circuit including a negative feedback circuit for limiting amplifier output current to a desired value during charging of the integrating or holding capacitor of such a unit by the amplifier without requiring an increase in the aperture or reset time of such a circuit. During the reset interval, the limiting circuit includes an impedance element which develops a voltage control signal representative of the charging current through the capacitor and a pair of parallel, oppositely-poled, unidirectionally-conducting devices responding as switches sensitive to the developed control signal.

This invention relates to an improved "fast-reset" integrator circuit, and more particularly to a mode-switchable electronic integrator or track-hold circuit capable of fast reset without causing amplifier overloading or instability.

Well known in the prior art is an electronic integrator comprising a highgain operational amplifier and a feedback capacitor, which circuit is switchable between three modes, including (1) an "operate" mode wherein the circuit integrates an input signal with respect to time to provide an output signal, (2) a "hold" mode wherein the integrator merely holds (preferably as long as desired, and without attenuating) the output voltage level it had at the beginning of the "hold" mode, and (3) a "reset" or "initial condition" mode, wherein the circuit output is altered (preferably rapidly) to be proportional (usually with a sign inversion) to a second applied signal termed a "reset" or "initial condition" signal. Various applications do not require the "operate" or integrating mode, but instead are intended solely for storage of signals, and the circuits utilized to fill such applications often omit the first-mentioned input signal connections otherwise required and receive only the "reset" type of input signals and are termed "track-and-hold" or "sample/hold" circuits. It is generally desirable that such circuits "track" or "sample" their input signals as quickly as possible.

The accuracy of such prior circuits both for integration and for long term holding is generally increased by the use of fairly large capacitors, typically of the order of 1.0 microfarad. The use of large capacitors may be said generally speaking, to interfere with rapid reset of such circuits to new "initial condition" or "reset" input signals, and to interfere with rapid tracking or sampling. Typical electronic integrators sold during the last several years have required time periods of the order of one second in order to reset to a new value with acceptable accuracy when a 1.0 microfarad capacitor has been used. A variety of advanced computer and instrumentation applications have created a need for improved integrator and track/hold circuits which can be reset to new values much more quickly. A number of attempts have been made in the prior art to provide circuits having a faster reset capability without lessening their long-term holding capabilities. Some prior art fast-reset circuits (for example, Pat. 3,161,858) disadvantageously require very high amplifier output currents which overload the amplifier, and disadvantageously encounter stability problems because they present purely capacitive loads to their amplifier output circuits. Other prior art fast reset circuits (for example, Pat. 3,231,728) have disadvantageously required additional amplifiers and have been difficult to design with sufficient stability and high performance.

Thus it is a primary object of the present invention to provide a track-hold or integrator circuit capable of very fast reset operation without amplifier overloading. Otherwise expressed, it is an object in such a circuit to limit amplifier charging current without increasing the circuit reset time-constant. If the amplifier charging currents are properly limited, the amplifier can have sufficient reserve current capability to properly drive normal loads without overloading.

It is another object of the invention to provide fast reset in such circuits without adversely affecting amplifier stability.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description, taken in connection with the accompanying drawings, in which:

FIG. 1*a* is a simplified schematic useful in understanding a preferred embodiment of the invention.

FIG. 1*b* is a table showing the condition of various switches in the device of FIG. 1*a* during each of three different operating modes.

FIGS. 2*a*, 2*b* and 2*c* are simplified circuit diagrams useful in understanding the operation of the device of FIG. 1*a* in each of its three distinct operating modes.

Figure 3:
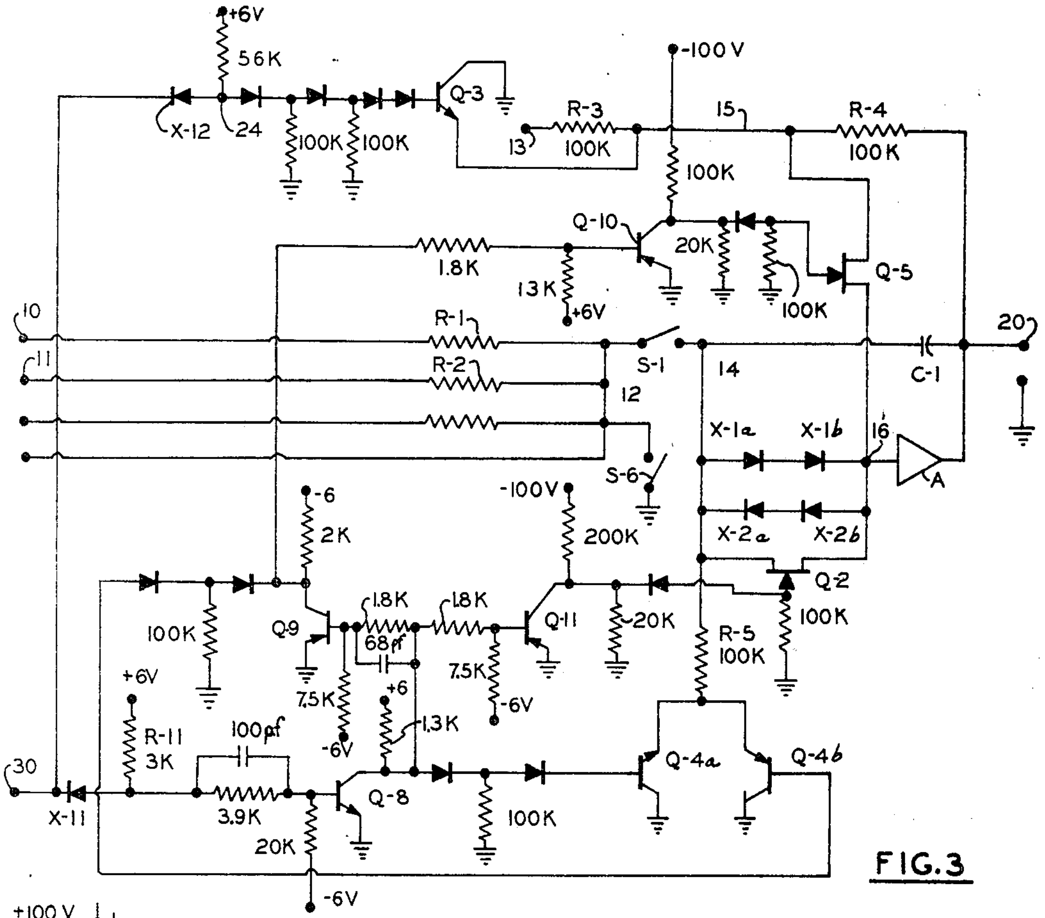
FIG. 3 is a detailed circuit diagram showing the preferred embodiment of the invention.

Referring now to FIGS. 1*a*, 1*b* and 2*a*, the circuit of FIG. 1 will be seen to show an electronic integrator which includes conventional input scaling resistors R–1, R–2, a conventional operational amplifier A, and a feedback capacitor C–1. It may be seen that the "operate" mode of the integrator is obtained by closing switches S–1 and S–2 to connect the input signals applied from terminals 10 and 11 via scaling resistors R–1 and R–2, with switches S–4, S–5 and S–6 maintained open. Switch S–3, which is in a sense optional and not an essential part of the present invention, would be closed, serving to ground terminal 15, to which one side of switch S–5 is connected, for the purpose of minimizing leakage and cross-coupling at switch S–5. Similarly, switch S–6 is optionally provided to minimize leakage across switch S–1 when the latter is open. Operation of the circuit of FIG. 1 during the "operate" mode will be seen from FIG. 2*a* to be completely conventional, with the output voltage at terminal 20 equaling the negative of the time integral of the sum of the two input currents applied through input resistors R–1 and R–2. Similarly, it will be readily apparent from the circuit configuration shown in FIG. 2*b* that operation in the "hold" mode is done in the conventional manner, with the opening of switch S–1 serving to disconnect the input signals from terminals 10 and 11.

During both the "operate" and "hold" modes, switch S–2 is closed so that terminals 14 and 16 are directly connected and diodes X–1 and X–2 are shorted, but as the circuit is switched to its "reset" mode, switch S–2 is opened and the two diodes are inserted into the main feedback path of the integrator circuit. During both the "operate" and "hold" modes, the initial condition or "IC" potential at terminal 13 has been ineffective, both from being shorted to ground through switch S–3, and from being disconnected from the amplifier A input circuit by switch S–5. Switch S–5 is opened, however, and switch S–5 is closed as the device is switched into the "reset" mode, connecting terminal 15 directly to the amplifier input terminal 16. Switching into the "reset" mode also requires closure of switch S–4, thereby connecting terminal 14 to ground through a low resistance R–5, typically of the order of 100 ohms.

The desired function of the circuit in the "reset" mode is that the output potential at terminal 20 become, as rapidly as possible, the inverse, or opposite polarity of the IC voltage then applied at terminal 13 (and of equal magnitude if resistors R–3 and R–4 are equal in size as will be assumed). Assume, for example, that prior to the initiation of a "reset" mode, that the circuit of FIG. 1 was holding in its "hold" mode, with +100 volts appearing at output terminal 20, so that integrating capacitor C–1 would be charged to 100 volts. Further assume, for sake of example, that IC terminal 13 is connected to a signal source (not shown) of +100 volts, so that proper "reset" action would be for output terminal 20 to swing through a 200-volt change to reach −100 volts, preferably as promptly possible after initiation of the "reset" mode. It will be appreciated that "reset" under such circumstances will require amplifier A to supply the current necessary to drive the 1.0 microfarand capacitor C–1 from a +100 volt level to a −100 volt level. It is desirable that the capacitor be driven to its new level as quickly as otherwise possible, but not so quickly as to overload amplifier A.

One rather obvious technique for preventing amplifier overload when driving a sample-hold storage capacitor to a new value to accomplish reset would involve connection of the capacitor to the amplifier output terminals through a proper size current-limiting resistance. If the amplifier can only supply 10 ma., for example, without overloading the current-limiting resistance required for a system operative over a 200 volt amplifier output range would have to be no less than 20,000 ohms, which, assuming a 1.0 microfarad capacitor, results in a 20 millisecond time constant. Using such a technique, the amplifier would supply 10 ma. to charge the capacitor at the very beginning of a reset operation, but would supply an exponentially decreasing current as the capacitor is recharged, and would be supplying an extremely small current by the time the capacitor could be assumed to be charged to its final value. A time period of 10 RC is ordinarily regarded as necessary to charge RC circuits to a given voltage with acceptable accuracy, so that 200 milliseconds would be required for an accurate reset operation using such a current-limiting resistance.

In the present invention, the storage capacitor is connected to be charged in two successive different phases. During the first phase T of a reset operation, the amplifier is connected to re-charge the capacitor through a current-metering resistance as distinguished from a current-limiting resistance, and a current-limiting control signal developed across the current-metering resistance controls the amplifier to limit its output voltage so as to provide maximum allowable output current, not merely at the initial instant of a reset operation, but for a sustained period until the capacitor is almost charged to its final reset value, so that the capacitor is charged much faster than is possible with a current-limiting resistance, but still without overloading the amplifier. Eventually the capacitor reaches a state of charge near its final value. At that time the current-limiting control signal is automatically disconnected and the amplifier continues to charge the capacitor through the resistance, which then is operating as a current-limiting resistance rather than a current-metering resistance. Even if as much as a 10 RC time period is allowed for re-charging during the second phase $\tau$ of the reset operation, the overall time $(T+\tau)$ required for reset may be much shorter, since a much smaller resistance may be employed.

Figure 4:
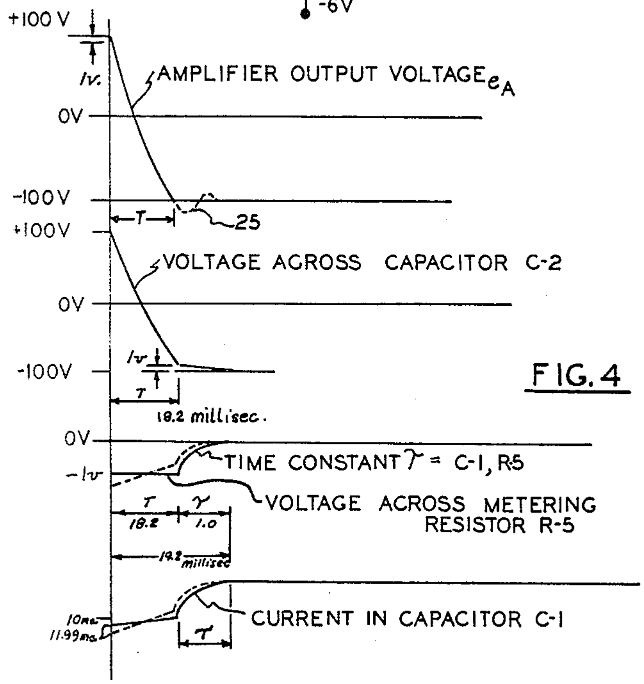
FIG. 4 is a collection of waveforms useful in understanding the improved reset capability of the present invention.

In FIG. 2*c*, with +100 volts across capacitor C–1 at the initial instant $t_0$ of a reset operation, and with a +100 volt IC potential at terminal 13, it will be seen that capacitor C–1 will have to be recharged through a 200 volt change to accomplish reset. As soon as the circuit is switched to the configuration of FIG. 2*c* to begin the first phase of a reset operation, it will be seen that as amplifier A drives output terminal 20 in a negative direction from its initial +100 volt potential, current will begin to flow upwardly through resistor R–5 and rightwardly through capacitor C–1. When that current reaches 10 ma., it will be seen to provide a 1.0 volt drop across resistor R–5, putting terminal 14 at −1.0 volt. Because the 1.0 volt drop occurs instantly, the output voltage of amplifier A will drop 1.0 volt at time $t_0$, as shown in FIG. 4. Assuming that 1.0 volt is the contact potential of diode X–2, it will be seen that diode X–2 will conduct applying a strong degenerative feedback signal to summing junction 16, thereby causing amplifier A to limit or regulate its output current to no more than 11 ma. A current of 1.0 ma. will flow rightwardly through resistor R–3 and a feedback current of .99 ma. will flow leftwardly through resistor R–4, so that initially a total current of 1.99 ma. will flow through diode X–2 to terminal 14, and the total current through capacitor C–1 initially will be 11.99 ma. With 11.99 ma. flowing through capacitor C–1 (assumed to be 1.0 microfarad), the output voltage will be changing 11,990 volts per second. If reset were to continue at the same rate until it was completely accomplished, the 200 volt swing would be seen to require only about 16.7 milliseconds, about a factor of 12 improvement in speed over the prior art technique. However, as the amplifier output terminal 20 is driven in a negative direction, through zero and then to an increasingly negative value, the current through feedback resistor R–4 decreases to zero and then begins to flow rightwardly, thereby slightly decreasing the current through capacitor C–1 gradually from its initial value of 11.99 ma. to a value of 10 ma., an average current during the time period T shown in FIG. 4 of 10.99 ma., so that the average rate of change of the voltage across capacitor C–1 is approximately 10,990 volts per second.

The amplifier output voltage $e_A$ and the voltage across capacitor C–1 are both shown plotted against time in FIG. 4. As the gradually decreasing current of 11.99 to 10 ma. is supplied to the 1.0 mfd. capacitor, the voltage across the capacitor will be seen to decrease nearly linearly in time by 199 volts in 18.2 milliseconds, shown as time period T in FIG. 4, until capacitor C–1 is only 1.0 volt away from complete reset.

When the circuit reaches a point only one volt away from reset, with the amplifier output voltage at −100 volts, with 1.0 volt across resistor R–5 and with 99.0 volts across capacitor C–1, it will be seen that further charging of capacitor C–1 will cause the voltage across resistor R–5 to fall below 1.0 volt, so that diode X–2 will no longer conduct and no longer apply a control signal to the amplifier input terminal. Thus during the last phase $\tau$ of a reset operation the capacitor is driven exponentially toward its final value, as shown during time period $\tau$ in FIG. 4. In FIG. 4 the time period $\tau$ is shown on a greatly expanded scale for convenience in illustration. Because resistor R–5 need be only a small resistance, the time-constant which governs the last phase of the reset cycle may be small. With the 100 ohm and 1.0 microfarad values shown, a time period of 10 RC equals only 1.0 milliseconds. Thus the total time $(T+\tau)$ for reset with the invention requires only 19.2 milliseconds, while the prior system requires 200 milliseconds if amplifier overload is to be avoided.

The waveforms shown in solid lines in FIG. 4 assume that diode X–2 is a "perfect" diode having an absolutely rectangular characteristic and that amplifier A has perfect frequency response and infinite loop gain. Due to rounding in an actual diode characteristic, the performance of an actual circuit will vary slightly in a manner indicated by dashed lines in the lower two curves of FIG. 4, and amplifier limitations may cause a slight overshoot as shown in dashed lines at 25 in the upper waveform of FIG. 4. Time $\tau$ will be seen to provide ample setting time however, so that the amplifier output voltage is wholly accurate at the end of time $\tau$.

Operation to reset in an opposite direction with diode X–1 controlling amplifier A should be apparent due to the symmetry of the circuit so that no detailed description of such an operation is believed to be necessary.

Various applications require different sizes of capacitors, of course. Assuming that X–1 and X–2 are diodes having 1.0 volt contact potentials and that resistor R–5 is 100 ohms in each case, the reset periods obtainable for a 200 volt swing with various commonly-used sizes of capacitors will be seen to be as follows:

| Capacitor C–1 | T (milliseconds) | $\tau$ (milliseconds) | T+$\tau$ (milliseconds) |
|---|---|---|---|
| 10 mfd | 182 | 10 | 192 |
| 1.0 mfd | 18.2 | 1.0 | 19.2 |
| 0.1 mfd | 1.82 | .10 | 1.92 |
| 0.01 mfd | .182 | .01 | .192 |

In many applications time $\tau$ may be shortened, say to four or five times the RC time constant and still provide acceptable accuracy. In various other applications, amplifier stability requirements may be relaxed by using a larger resistance (e.g. 500 ohms) for resistor R–5 and diodes having a larger contact potential. Also, rather than a pair of diodes in parallel, a series connection of diodes such as Zener diodes X–3 and X–4 shown in dashed lines in FIG. 1*a* may be substituted for X–1 and X–2.

In the detailed actual embodiment of the invention illustrated in FIG. 3, the function of switches S–2, S–3, S–4, and S–5 of FIG. 1 are provided by transistors Q–2, Q–3, Q–4, and Q–5 respectively. Parts of FIG. 3 corresponding to those of the simplified diagram of FIG. 1 are given corresponding designations. The circuit of FIG. 3 is switched from "operate" or "hold" to the "reset" mode by lowering the control potential applied at terminal 30 from +6 to zero volts. When the control voltage applied at terminal 30 is +6 volts, whether the device is in the "operate" mode or "hold" mode depends upon the condition of switch S1, which is shown again in simplified form in FIG. 3. Switch S–1 preferably comprises an electronic switch of the type shown in Appl. Ser. No. 374,341 filed June 11, 1964 by Elmer G. Gilbert, and switch S–6 which is optional, may comprise a further switch of known type controlled by the same means (not shown) used to control switch S–1, with switch S–1 closed during an "operate" mode and open during a "hold" mode.

During the "operate" mode, the positive potential at control terminal 30 cuts off current flow through diode X–11 from resistor R–11, raising the potential at the Q–8 base sufficiently to turn on Q–8. The drop in Q–8 collector voltage cuts off Q–4*a* base current, cutting off transistor Q–4*a*. The lowered Q–8 collector voltage also turns transistor Q–9 on, raising the Q–9 collector voltage, which cuts off current flow from the Q–4*b* base, insuring that transistor Q–4*b* is cut off. The raised Q–9 collector voltage also raises the Q–10 base voltage, cutting off Q–10, which results in the Q–10 collector being held firmly negative, thereby back-biasing field-effect transistor Q–5 in an off or "open" condition. The lowered Q–8 collector voltage also turns on transistor Q–11, causing a large upward excursion in the Q–11 collector voltage, thereby switching on field-effect transistor Q–2, so that diodes X–1*a*, X–1*b*, X–2*a*, and X–2*b* are shorted across. The +6 volt potential at control terminal 30 also will be seen to back-bias diode X–12, thereby raising the voltage at terminal 24 and turning on transistor Q–3, so that terminal 15 is shorted to ground. The opposite operation which occurs when control terminal 30 is lowered to zero volts will be readily deducible from the above and need not be recited in detail. A pair of transistors Q–4*a* and Q–4*b* connected oppositely in an inverted configuration are utilized to provide the function of switch S–4 to provide symmetrical operation and very low offset. Also, pairs of diodes (X–1*a*, X–1*b* and X–2*a*, X–2*b*) are shown connected in series to provide the desired contact potential, each diode having a 0.5 volt potential and a 1.0 volt potential being desired.

It will thus be seen that the objects set forth above, among those made apparent from the preceding description, are efficiently attained, and since certain changes may be made in the above constructions without departing from the scope of the invention, it is intended that all matter contained in the above description be interpreted as illustrative and not in a limiting sense.

The embodiments of the invention in which an exclusive property or privilege is claimed are defined as follows:

1. An electronic storage circuit, comprising, in combination: a high-gain direct-coupled amplifier having an output terminal and an input circuit having an input terminal and a reference terminal; an input impedance adapted to be connected at one end to an input signal source; a feedback impedance connected to said output terminal and to the other end of said input impedance; first switch means for connecting the junction between said impedances to said input terminal; a capacitor connected between said output terminal and a second terminal; a unidirectionally-conducting device having a forward contact potential connected between said second terminal and said input terminal; second switch means connected in parallel with said device; a third impedance; and third switch means for connecting said third impedance between said second terminal and said reference terminal.

2. A circuit according to claim 1 having means responsive to a control signal for closing said first and third switch means and opening said second switch means to cause the voltage at said output terminal to become proportional in magnitude to a signal from said input signal source.

3. A circuit according to claim 1 having a second input impedance connected between a second input signal source and a further terminal; and fourth switch means for connecting said further terminal to said second terminal.

4. A circuit according to claim 1 having a second oppositely-poled unidirectionally-conducting device connected in parallel with said second switch means.

5. A circuit according to claim 1 in which said unidirectionally-conducting device comprises Zener diodes connected in series between said second terminal and said input terminal.

6. In an electronic storage circuit, having a high-gain direct-coupled amplifier having an output terminal and an input circuit including an input terminal and a reference terminal, a storage capacitor connected at one end to said output terminal and at its other end to said input terminal, the combination of: first switch means and first and second impedance means for connecting an input signal and a feedback signal from said output terminal to said input terminal; second switch means for inserting a diode means between said storage capacitor and said input terminal; and third switch means for connecting said other end of said capacitor through a third impedance to said reference terminal, whereby current flow through said capacitor and said third impedance biases said diode means to apply a control signal to said input terminal to control current output of said amplifier.

7. An electronic storage circuit, comprising, in combination: a high-gain direct-coupled amplifier having an output terminal and an input circuit having an input terminal and a reference terminal; an input impedance adapted to be connected at one end to an input signal source; a feedback impedance connected to said output terminal and to the other end of said input impedance; first switch means for connecting the junction between said impedances to said input terminal; a capacitor connected between said output terminal and a second terminal; a third impedance; second switch means for connecting said third impedance between said second terminal and said reference terminal; and means responsive to the potential across said third impedance for controlling current flow between said second terminal and said input terminal to limit the output current of said amplifier to no more than a predetermined value.

8. An electronic storage circuit, comprising, in combination: a high-gain amplifier having an input circuit, an output terminal, a plurality of direct-coupled amplifying stages connected between said input circuit and said output terminal, said input circuit comprising an input terminal and a reference terminal, said amplifying stages collectively providing signal inversion between said input terminal and said output terminal; an input impedance and a feedback impedance connected in series between an input signal source and said output terminal; first switch means for connecting the junction between said impedances to said input terminal; a capacitor connected between said output terminal and a second terminal; means for deriving a control signal commensurate with current flow through said capacitor; and current-controlling means controlled by said control signal and connected between said second terminal and said input terminal to conduct negative feedback current between said second terminal and said input terminal when said control signal tends to exceed a predetermined value, thereby limiting the output current of said amplifier.

9. A circuit according to claim 8 in which said means for deriving said control signal comprises a third impedance and second switch means for connecting said third impedance between said second terminal and said reference terminal.

10. A circuit according to claim 7 in which the last-stated means comprises voltage-sensitive switching means connected between said second terminal and said input terminal.

11. A circuit according to claim 7 in which the last-stated means comprises a pair of oppositely-poled diodes connected in parallel with each other between said second terminal and said input terminal.

12. A circuit according to claim 7 having third switch means connected between said second terminal and said input terminal.

13. A circuit according to claim 7 having third switch means connected between said second terminal and said input terminal, and fourth switch means for applying an input signal from a second signal source to said second terminal.

14. A circuit according to claim 7 in which the last stated means comprises bi-directional Zener diode means connected between said second terminal and said input terminal.

15. A circuit according to claim 7 in which the last-stated means comprises voltage-sensitive switching means operative to apply current to said input terminal only when said potential across said third impedance exceeds the maximum allowable output current of said amplifier times the value of said third impedance.

16. A circuit according to claim 7 having means for simultaneously closing said first and second switch means.

17. A circuit according to claim 13 having means for closing said third and fourth switch means while simultaneously opening said first and second switch means and vice versa.

18. An electronic storage circuit, comprising, in combination: a high-gain direct-coupled amplifier having an output terminal and an input circuit having an input terminal and a reference terminal; an input impedance adapted to be connected at one end to an input signal source; a feedback impedance connected to said output terminal and to the other end of said input impedance; first switch means for connecting the junction between said impedances to said input terminal; a capacitor connected between said output terminal and a second terminal to be charged from an initial voltage value to a value commensurate with a signal from said input signal source during a reset period commencing with closure of said first switch means; means for measuring current flow through said capacitor to derive a first control signal; and means responsive to a magnitude of said first control signal representing a predetermined amount of capacitor current flow for applying a second control signal to said input circuit of said amplifier to limit the output current from said amplifier and provide a substantially constant amount of current flow through said capacitor during a first portion of said reset period and for disconnecting said second control signal from said input circuit upon decrease of capacitor current flow below a predetermined value to provide an exponentially-decreasing amount of current flow through said capacitor during a second portion of said reset period.

19. A circuit according to claim 18 in which said means for measuring current flow through said capacitor comprises a third impedance and second switch means for connecting said third impedance between said second terminal and said reference terminal whereby the voltage across said third impedance comprises said first control signal, and in which said means responsive to said first control signal comprises voltage-sensitive switching means conencted between said second terminal and said input terminal.

20. The method of achieving fast reset of an electronic storage circuit in which a capacitor is charged from an initial value to a final value by the output current of a high-gain direct-coupled amplifier without overloading the amplifier comprising the steps of applying an input signal to said amplifier commensurate with said final value, connecting a first degenerative feedback signal from the output of said amplifier to the input of said amplifier through a resistance, simultaneously connecting the capacitor to the output terminals of the amplifier in series with an impedance to derive a potential across the impedance commensurate with current flow through the capacitor; applying a second degenerative feedback signal to the amplifier to limit the amplifier output current substantially to a predetermined amount until the potential across the impedance decreases below a predetermined limit, and then terminating the application of the second degenerative feedback signal to the amplifier to allow the capacitor to be charged exponentially to said final value.

References Cited

UNITED STATES PATENTS

| | | | |
|---|---|---|---|
| 3,050,673 | 8/1962 | Widmer | 307—229 X |
| 3,129,326 | 4/1964 | Balaban | 307—229 X |
| 3,153,152 | 10/1964 | Hoffman | 330—9 X |
| 3,249,925 | 5/1966 | Single et al. | 340—173 |
| 3,381,229 | 4/1968 | Sikorra | 307—229 X |
| 3,231,728 | 1/1966 | Kusto | 235—183 |
| 3,304,506 | 2/1967 | Weekes | 328—151 |
| 3,304,507 | 2/1967 | Weekes | 328—151 |
| 3,341,696 | 9/1967 | Thaulow | 235—183 |

JAMES W. MOFFITT, Primary Examiner

J. F. BREIMAYER, Assistant Examiner

U.S. Cl. X.R.

235—183; 307—229; 328—151